(12) United States Patent
Sadeh-Shirazi et al.

(10) Patent No.: US 10,333,639 B2
(45) Date of Patent: Jun. 25, 2019

(54) SMALL-FOOTPRINT DIGITAL SYNTHESIS CHANNELIZER FOR MULTIPLE NARROWBAND FREQUENCY-SLICES

(71) Applicant: Capacicom Ltd., Kfar Netter (IL)

(72) Inventors: Avihay Sadeh-Shirazi, Tel Aviv (IL); Ronen Mayrench, Raanana (IL); Nitzan Ron, Zichron Yaakov (IL); Ariel Yagil, Ein Sarid (IL); Naor Goldman, Ein-Vered (IL); Daniel Wajcer, Beit-Yehoshua (IL)

(73) Assignee: CAPACICOM LTD., Kfar Netter (IL)

( * ) Notice: Subject to any disclaimer, the term of this patent is extended or adjusted under 35 U.S.C. 154(b) by 0 days.

(21) Appl. No.: 15/974,717

(22) Filed: May 9, 2018

(65) Prior Publication Data

US 2018/0351672 A1 Dec. 6, 2018

Related U.S. Application Data

(63) Continuation-in-part of application No. 15/613,293, filed on Jun. 5, 2017, now Pat. No. 10,009,203.

(51) Int. Cl.
| | |
|---|---|
| *H04H 20/78* | (2008.01) |
| *H04L 27/36* | (2006.01) |
| *H04N 21/61* | (2011.01) |
| *H04L 12/28* | (2006.01) |
| *H04N 7/10* | (2006.01) |
| *H04L 27/00* | (2006.01) |
| *H04L 29/06* | (2006.01) |

(52) U.S. Cl.
CPC ......... *H04H 20/78* (2013.01); *H04L 12/2801* (2013.01); *H04L 27/00* (2013.01); *H04L 27/36* (2013.01); *H04L 63/0227* (2013.01); *H04N 7/10* (2013.01); *H04N 21/6118* (2013.01)

(58) Field of Classification Search
CPC ... H04L 27/2334; H04L 27/148; H04L 27/22; H04L 29/06578
See application file for complete search history.

(56) References Cited

U.S. PATENT DOCUMENTS 6,014,366 A * 1/2000 Ichiyoshi ............... H04J 4/005
370/210
6,704,372 B2 * 3/2004 Zhang .............. H04N 21/42607
375/316

(Continued)

*Primary Examiner* — Jaison Joseph
(74) *Attorney, Agent, or Firm* — Kliger & Associates

(57) ABSTRACT

A digital synthesis channelizer includes a memory buffer and circuitry. The memory buffer stores samples of N input signals having a sampling rate Fsi. The N input signals are processed, prior to storing in the memory buffer, by an N-point time-frequency transform module. The circuitry includes at least P filters derived from a Low-Pass Filter whose stopband frequency depends on Fsi. The circuitry is configured to set a sampling time according to a predefined output sampling rate Fso=λ·Fsi, λ being a predefined rate-conversion ratio, to select based on the sampling time one or more filters out of the at least P filters, and using the selected one or more filters, to generate, from at least some of the samples in the memory buffer, a filtered and interpolated output sample of an output signal that sums N digitally resampled by λ and frequency-shifted versions of the respective N input signals.

24 Claims, 3 Drawing Sheets

(56) References Cited

U.S. PATENT DOCUMENTS

| | | | |
|---|---|---|---|
| 6,819,706 B1* | 11/2004 | Lim | H03G 3/3078 |
| | | | 375/130 |
| 7,339,504 B1* | 3/2008 | Li | H03H 17/028 |
| | | | 341/60 |
| 8,610,514 B2* | 12/2013 | Laudel | H04L 27/36 |
| | | | 332/103 |
| 10,009,203 B1* | 6/2018 | Sadeh-Shirazi | H04L 63/0227 |
| 2003/0112904 A1* | 6/2003 | Fuller | H04B 1/7093 |
| | | | 375/350 |
| 2004/0042557 A1* | 3/2004 | Kabel | H03H 17/0266 |
| | | | 375/260 |

* cited by examiner

SMALL-FOOTPRINT DIGITAL SYNTHESIS CHANNELIZER FOR MULTIPLE NARROWBAND FREQUENCY-SLICES

CROSS-REFERENCE TO RELATED APPLICATIONS

This application is a continuation in part of U.S. patent application Ser. No. 15/613,293, filed Jun. 5, 2017, whose disclosure is incorporated herein by reference.

TECHNICAL FIELD

Embodiments described herein relate generally to communication systems, and particularly to methods and systems for processing narrowband signals in digital channelizers.

BACKGROUND

In various communication systems, such as in wireless or cable communications, a synthesis channelizer processes multiple narrowband signals to produce a broadband multichannel signal.

Methods for processing narrowband signals are known in the art. For example, various multi-channel transmitter architectures are described by Harris et al. in "Digital Receivers and Transmitters Using Polyphase Filter Banks for Wireless Communications," IEEE Transactions on Microwave Theory and Techniques, volume 51, issue 4, April 2003, pages 1395-1412.

U.S. Pat. No. 8,610,514 describes a full spectrum modulator that processes a plurality of Cable TV (CATV) channels from separate paths. Each path has (i) a first filter for pulse shaping an input channel signal and up-sampling a channel frequency thereof, (ii) an interpolator for interpolating the output of the first filter to a common sample rate, and (iii) a decimator for centering the output of the interpolator on a predetermined channel bandwidth. An Inverse Discrete Fourier Transform (IDFT) processor receives channel signal outputs from the decimators. A Polyphase filter bank receives IDFT processed parallel channel signals from the IDFT processor. A commutator converts the processed parallel channel signals from the Polyphase filter bank to a single stream of data. A second filter up-samples the single stream of data to a fixed output sampling rate and low pass filters alias signals therefrom.

SUMMARY

An embodiment that is described herein provides a digital synthesis channelizer that includes a memory buffer and circuitry. The memory buffer is configured to store samples of N input signals having a sampling rate Fsi. The N input signals are processed, prior to storing in the memory buffer, by an N-point time-frequency transform module. The circuitry includes at least P filters derived from a prototype Low-Pass Filter (LPF) whose stopband frequency depends on Fsi. The circuitry is configured to set a sampling time according to a predefined output sampling rate $Fso=\lambda \cdot Fsi$, $\lambda$ being a predefined rate-conversion ratio, to select based on the sampling time one or more filters out of the at least P filters, and using the selected one or more filters, to generate, from at least some of the samples in the memory buffer, a filtered and interpolated output sample of an output signal, the output signal sums N digitally resampled by $\lambda$ and frequency-shifted versions of the respective N input signals.

In some embodiments, the circuitry is configured to compute the filtered and interpolated output sample (i) after setting the sampling time and (ii) as a function of the sampling time. In other embodiments, $\lambda$ is an irrational number. In yet other embodiments, $\lambda$ equals a rational number P1/Q1, P1 and Q1 being integer numbers, and P1 is different from P.

In an embodiment, the circuitry is configured to generate the output signal with the input signals frequency-shifted to respective center frequencies that are multiples of Fso/N. In another embodiment, the circuitry is configured to calculate the filtered and interpolated output sample by selecting multiple filters, out of which first and second filters correspond respectively to a first sampling time that occurs before or at the sampling time, and to a second sampling time that occurs after the sampling time, and calculating a resampling filter by interpolating among respective coefficients of the multiple filters, depending on an offset of the sampling time from the first sampling time. In yet another embodiment, the circuitry is configured to calculate the resampling filter by interpolating among the multiple filters using a shifted version of at least one of the multiple filters.

In some embodiments, the circuitry is configured to calculate the filtered and interpolated output sample by selecting multiple filters, out of which first and second filters are aligned respectively to a first sampling time that occurs before or at the sampling time, and to a second sampling time that occurs after the sampling time, filtering the at least some of the samples in the memory buffer using each of the multiple filters to produce multiple respective filtered outputs, and interpolating among the filtered outputs depending on an offset of the sampling time from the first sampling time. In other embodiments, the circuitry is configured to wait until storing subsequent N samples in the memory buffer, prior to producing at least one of the filtered outputs using a respective filter. In yet other embodiments, the circuitry is configured to select a first filter that corresponds to an input sampling interval, and a second filter that corresponds to a subsequent input sampling interval, and to calculate a resampling filter by interpolating between coefficients of the first and second filters.

In an embodiment, the sampling time falls within a given sub-interval of an input sampling interval, and the circuitry is configured to select first and second filters that are aligned to respective first and second edges of the sub-interval, and to approximate a value of the filtered and interpolated output sample, by selecting one of the first and second filters. In another embodiment, the circuitry is configured to create a null frequency-slice in the output signal, by receiving or generating a zero input signal including all zero samples, and up-converting the input signal to a respective center frequency of the frequency-slice.

There is additionally provided, in accordance with an embodiment that is described herein, a method including, in a digital synthesis channelizer, storing samples of N input signals having a sampling rate Fsi in a memory buffer of the digital synthesis channelizer. The N input signals are processed, prior to storing in the memory buffer, by an N-point time-frequency transform module. The digital synthesis channelizer includes at least P filters derived from a prototype Low-Pass Filter (LPF) whose stopband frequency depends on Fsi. A sampling time is set according to a predefined output sampling rate $Fso=\lambda \cdot Fsi$, $\lambda$ being a predefined rate-conversion ratio. Based on the sampling time, one or more filters are selected out of the at least P filters. Using the selected one or more filters, a filtered and interpolated output sample of an output signal is generated from at least some of the samples in the memory buffer. The output signal sums N digitally resampled by λ and frequency-shifted versions of the respective N input signals.

These and other embodiments will be more fully understood from the following detailed description of the embodiments thereof, taken together with the drawings in which:

DETAILED DESCRIPTION OF EMBODIMENTS

Overview

Figure 1:
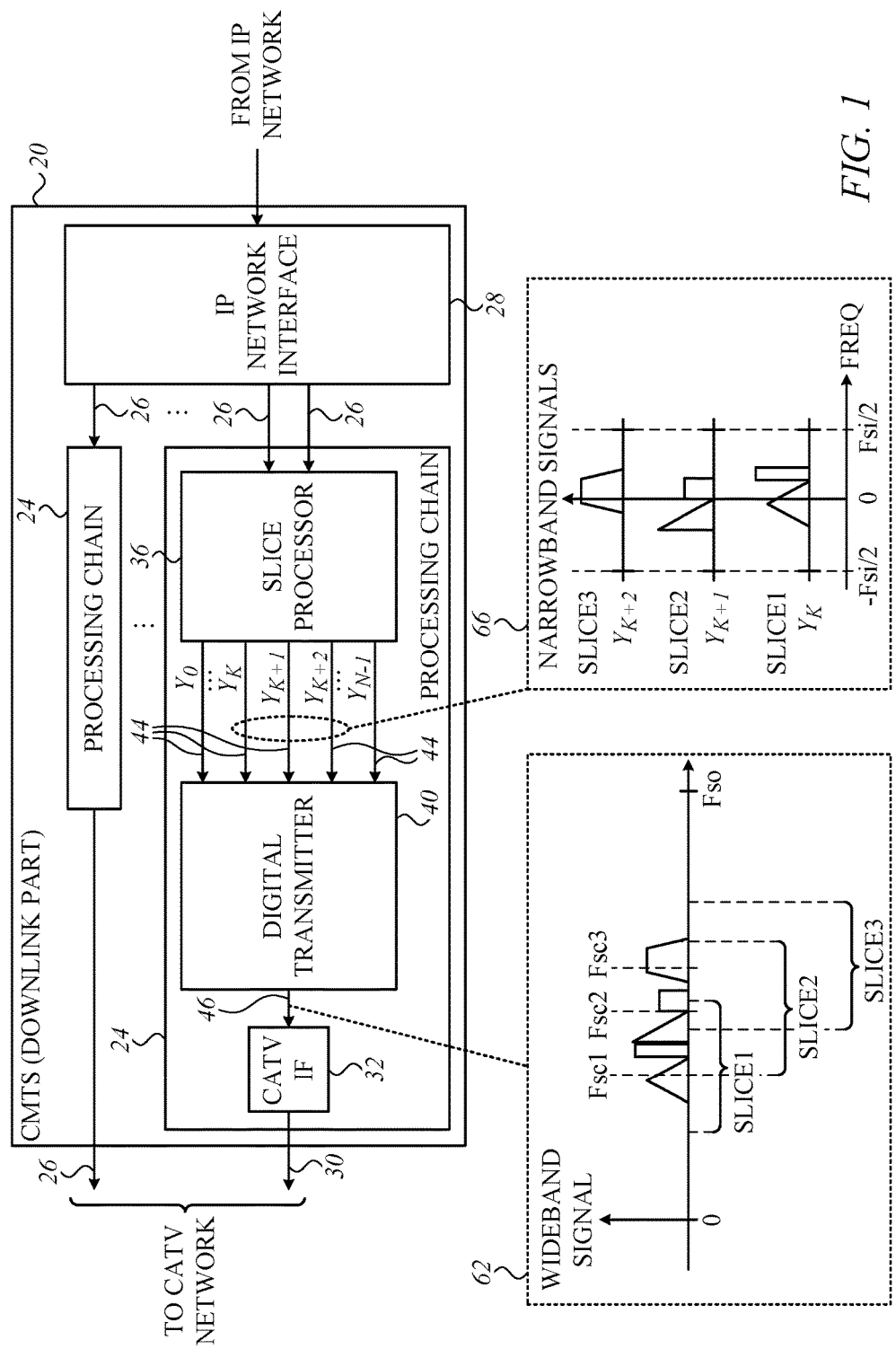
FIG. 1 is a block diagram that schematically illustrates a downlink part of a Cable Modem Termination System (CMTS), in accordance with an embodiment that is described herein.

In various communication and signal-processing applications, multiple narrowband signals are processed to be combined into a single broadband signal. The broadband signal is typically sampled at a higher sampling rate than the individual narrowband signals.

Embodiments that are described herein provide improved methods and systems for processing multiple narrowband signals. In the disclosed embodiments, a digital synthesis channelizer receives multiple input signals and produces from the input signals a broadband output signal in which the input signals are resampled and up-converted to respective center frequencies. The digital synthesis channelizer is also referred to herein as a "synthesis filter bank". In the context of the present disclosuer, a "synthesis channelizer" is also referred to simply as "channelizer" for brevity. Each input signal occupies a respective frequency-slice within the bandwidth of the output signal. The sampling rate of the input signals is denoted Fsi and the sampling rate of the output signal is denoted Fso. The rate-conversion ratio Fso/Fsi is denoted λ. In the disclosed embodiments λ is a predefined arbitrary positive number.

In the description that follows we generally assume that the input signals are narrowband signals that are up-sampled to a higher sampling rate, i.e., Fso>Fsi or λ>1. Although this assumption is valid in various applications it is not mandatory, and the embodiments that will be described below are also applicable to down-sampling the input sampling rate, as well.

Let N denote the number of narrowband input signals sampled at the input rate Fsi, and let $u_k(m)$, k=0 . . . N−1 denote versions of the input signals up-sampled to the output rate Fso. In many practical applications, the input signals are up-converted to center frequencies that are distributed evenly along the frequency axis, e.g., up-converted to respective center frequencies Fso·k/N, k=0 . . . N−1.

In principle, the digital transmitter could process the input signals by (i) up-sampling each of the narrowband input signals to Fso, (ii) up-converting each of the up-sampled signals $u_k(m)$ to a respective center frequency Fso·k/N, and (iii) sum the up-sampled and up-converted signals to produce the output broadband signal X(m) as given by:

$$X(m) = \sum_{k=0}^{N-1} u_k(m) \cdot e^{2\pi j \frac{k}{N} m} \qquad \text{Equation 1}$$

A direct implementation of Equation 1, as described above is, however, typically highly inefficient.

In the disclosed embodiments, the up-sampled signals $u_k(m)$ are implicitly expressed as generated from the narrowband input signals using a suitable resampling filter $\underline{h}_m$ that changes in time. Assuming that the resampling filter has Lp coefficients, the up-sampled signals can be expressed by the time convolution:

$$u_k(m) = \sum_{i=0}^{L_p-1} Y_k(n_m - i) \cdot \underline{h}_m(i), k = 0 \ldots N-1 \qquad \text{Equation 2}$$

In Equation 2, the coefficients of the impulse response of the resampling filter are indexed as a one-sided casual filter. Alternatively, these coefficients can be indexed assuming that the resampling filter has a two-sided impulse response. In some embodiments, the coefficients of the resampling filter are calculated from predefined sub-filters using interpolation techniques. The number P of sub-filters is a design parameter. The sub-filters typically comprise Polyphase filters that are derived from a prototype Low-Pass Filter (LPF), as will be described below. Using Equation 2, Equation 1 can be re-written as:

$$X(m) = \sum_{i=0}^{L_p} \underline{h}_m(i) \sum_{k=0}^{N-1} Y_k(n_m - i) \cdot e^{2\pi j \frac{k}{N} m} \qquad \text{Equation 3}$$

Equation 3 implies an efficient digital transmitter (or channelizer) architecture in which the digital transmitter first transforms the N input signals, e.g., using an N-point Inverse Discrete Fourier Transform (IDFT), and then filters samples of the transformed signals using a resampling filter $\underline{h}_m$ whose coefficients depend on the output sampling time.

In some embodiments, the digital transmitter receives a vector of N input samples of the respective narrowband signals and applies to this vector an N-point IDFT to produce a respective vector of N transformed samples. The IDFT may be implemented efficiently using an Inverse Fast Fourier Transform (IFFT) module. The digital transmitter stores the N transformed samples in a memory buffer that is organized in a two-dimensional (2D) array of N rows and Lp columns. The digital transmitter manages the memory buffer as a column-wise FIFO and stores vectors of N transformed samples in the memory buffer at the input sampling rate.

To produce output samples at the Fso rate, the digital transmitter determines output sampling times Tm=m·Tso=m·Tsi/λ, wherein Tsi=1/Fsi and Tso=1/Fso are the respective input and output sampling intervals. Based on an output sampling time, the digital transmitter selects, one or more sub-filters out of the P sub-filters, and constructs from the selected sub-filters a resampling filter that is aligned to the desired output sampling time. The digital transmitter selects, based on the output sampling time, a row of transformed samples in the memory buffer, and filters the samples of the selected row using the resampling filter to produce an output sample at time Tm.

In an embodiment, the Tsi interval is virtually divided into P sub-intervals. The digital transmitter produces an output sample that is time-aligned to the edge of one of these sub-intervals using a resampling filter that equals a respective sub-filter selected out of the P sub-filters. The sub-filters are therefore referred to as being "aligned" to the respective sub-intervals of the input time interval. To produce an output sample that falls inside a sub-interval, the digital transmitter constructs the resampling filter by interpolating among respective coefficients of two or more selected sub-filters. Two of the selected sub-filters are respectively aligned to the edges of the sub-interval in question.

In alternative embodiments, when the output sample falls inside a sub-interval, the transmitter first up-samples the transformed samples in the selected row to Fso by filtering these samples using each of the selected sub-filters, and then interpolates between the multiple filtered outputs to produce the output sample at time Tm.

Selecting the number P of sub-filters enables a design tradeoff between accuracy and memory size. A higher number of sub-filters results in a more accurate approximation of the output sample value at the output sampling time (e.g., by better approximating the resampling filter required for generating the output sample at the output sampling time) but requires a larger storage area, and vice versa. This tradeoff applies to both irrational values of $\lambda$ and to rational values of $\lambda$ that is defined as a ratio between two large coprime integers. In some embodiments, the number of sub-intervals dividing Tsi is P, but the actual number of sub-filters is larger than P.

In some embodiments, when $\lambda=P1/Q1$ wherein P1 and Q1 are large coprime integers, the actual number of sub-filters P is designed to be much smaller than P1 to reduce storage area and computational complexity. In such embodiments, sampling at the desired sampling rate $\lambda$ is achieved using an interpolated resampling filter that is time dependent as described above.

The disclosed channelizer architecture enables flexible design. For example, since the buffering and processing of the transformed samples are carried out independently and in parallel, the number N of input signals, the up-sampling ratio $\lambda$ and the number P of sub-filters can be selected almost independently from one another, i.e., selecting one of these parameters to fulfill design requirements does not necessarily dictate the values of the other two parameters.

The disclosed channelizer architecture is very efficient in terms of calculations per output sample and storage space, resulting in high throughput and low power consumption.

System Description

FIG. 1 is a block diagram that schematically illustrates a downlink part of a Cable Modem Termination System (CMTS) 20, in accordance with an embodiment that is described herein. CMTS 20 is typically located in a cable company's headend or hub-site, and provides high speed data services, such as cable Internet or Voice over Internet Protocol (VOIP), to cable subscribers.

For providing Internet and other IP-based services to cable subscribers, CMTS 20 connects to a Cable Television (CATV) network to which the cable subscribers are connected on one side, and to an IP network such as the Internet on the other side.

The CATV network may comprise, for example, a Hybrid Fiber-Coaxial (HFC) system that combines optical fiber and coaxial cable. The CATV network typically extends from the CMTS, possibly via regional headend units, to a neighborhood's local hub-site, and finally to a coaxial cable node, which typically serves several thousand homes.

In some applications, upstream data received from the subscriber via the CMTS over the IP network is carried in Ethernet frames encapsulated in Data-Over-Cable Service Interface Specifications (DOCSIS) frames. Downstream data is modulated by the CMTS using a suitable modulation scheme such as QPSK or QAM and transmitted using time and/or frequency sharing mechanisms. The bandwidth occupied by the downstream data depends on the underlying protocols. In the DOCSIS 2.0 protocol, for example, the downstream bandwidth allocation depends on geographic regions and may be between 108 MHz and 1002 MHz. The DOCSIS 2.0 protocol is specified, for example, in "Data-Over-Cable Service Interface Specifications, DOCSIS 2.0, Radio Frequency Interface Specification," Apr. 22, 2009, which is incorporated herein by reference. A later version—DOCSIS 3.0 that has evolved from the DOCSIS 2.0 protocol is specified, for example, in "DOCSIS 3.0 Physical Layer Specification," Dec. 7, 2017, which is incorporated herein by reference.

CMTS 20 comprises one or more processing chains 24 that each receives one or more bit-streams 26 from the IP network via a network interface 28 and produces from the bit-streams an analog broadband signal 30 that carries subscriber data that the processing chain transmits to respective subscribers over the CATV network via a CATV interface 32. Analog broadband signal 30 is typically an Intermediate Frequency (IF) signal that comprises In-phase and Quadrature (IQ) components. Processing chain 24 additionally comprises a slice processor 36 and a digital transmitter 40. Digital transmitter 40 is implemented as a digital channelizer that can be used in various signal processing and other applications, not necessarily related to CATV, as will be described further below.

In the present example, bit-streams 26 are carried encapsulated in IP packets in accordance with a suitable protocol. Network interface 28 receives the IP packets from the IP network, e.g., using a Network Interface Controller (NIC) (not shown). Network interface 28 extracts one or more bit-streams 26 received by the CMTS from the IP network. Alternatively, network interface 28 may receive bit-streams 26 from any other suitable data source or network operating in accordance with any suitable protocols.

Slice processor 36 processes one or more of the bit-streams received from the IP network (or from another suitable source) to generate slice-signals 44 that each demodulates one or more bit-streams into a narrowband signal that occupies a respective frequency band. In the present example, the slice processor outputs a number N of narrowband slice-signals denoted $Y_k, k=0 \ldots N=1$. The slice-signals are typically baseband signals sampled at the sampling rate Fsi.

Digital transmitter 40 receives the N narrowband slice-signals 44 from slice processor 36 and combines them into a digital broadband signal 46. The bandwidth occupied by slice-signals 44 is typically much narrower than the bandwidth of digital broadband signal 46. Specifically, the digital transmitter resamples each of slice-signals 44 to have an output sampling rate denoted Fso. In the present example, the digital transmitter increases the sampling rate of narrowband slice-signals 44, i.e., Fso>Fsi.

The digital transmitter further up-converts each of the resampled signals to respective carrier frequencies that, in the present example, are multiples of Fso/N. The digital broadband signal 46 merges (i.e., sums) the individual resampled and up-converted versions of the N narrowband slice-signals. In some embodiments that will be described in detail below, the digital transmitter performs the phases of resampling, up-conversion and merging of the narrowband signals as a combined parallel operation, which is much more efficient than carry out these phases serially.

CATV interface 32 converts digital broadband signal into an analog signal by converting the sequence of digital samples of the digital broadband signal to analog form using a Digital to Analog Converter (DAC) (not shown). The digital samples of digital broadband signal 46 may have any suitable resolution such as, for example, bits or 14 bits per sample. When digital broadband signal 46 is an Intermediate Frequency (IF) signal, the digital samples of digital broadband signal 46 are complex-valued. In CATV applications, the sampling rate of digital broadband signal 46 is typically above 1002 MHz samples per second, e.g., 1500 MHz.

CATV interface 32 further interfaces between the CMTS and the CATV network. For example, in case of a coaxial CATV network, CATV interface 32 may comprise elements (not shown) such as an up-converter module that up-converts digital broadband signal 46, or the analog signal produced therefrom, to a suitable carrier frequency, a Radio Frequency (RF) amplifier, one or more directional couplers, e.g., for separating between downstream signals transmitted to the CATV network and upstream signals received from the CATV network, and the like. In case of an optical CATV network, CATV interface comprises an electrical-to-optical converter (not shown) for converting digital broadband signal 46 from an electrical signal into an optical signal.

The lower part of FIG. 1 depicts an example wideband signal in a frequency-domain view 62, and the narrowband frequency-slices from which this broadband signal is generated by the digital transmitter, in a frequency-domain view 66. In the present example, frequency-domain view 66 depicts three narrowband signals (out of the N narrowband signals produced by slice processor 36) denoted $Y_k, Y_{k+1}$ and $Y_{k+2}$, each of which is a baseband signal sampled at an input sampling rate Fsi. In the figure, SLICE1, SLICE2 and SLICE3 denote the respective frequency bands of $Y_k$, $Y_{k+1}$ and $Y_{k+2}$.

In frequency-domain view 62, each of the narrowband signals is up-sampled to an output sampling rate Fso>Fsi, and up-converted to a respective center frequency Fsc1, Fsc2 and Fsc3. In some embodiments, the center frequencies are distributed evenly along the frequency axis. For example, the center frequencies may be multiples of Fso/N, in an embodiment. Note that the frequency bands of the up-converted signals may overlap. In some embodiments, the up-conversion scheme of the digital transmitter is designed so that the narrowband signals in the merged broadband signal are separated in frequency. In the present example, the narrowband signals in frequency-domain view 62 are separated in frequency even though their respective frequency bands overlap.

The ratio between the output and input sampling rates is denoted $\lambda$, i.e., Fso=$\lambda$·Fsi, wherein in the disclosed embodiments $\lambda$ is an arbitrary positive number. In some embodiments, Fso can be represented as a rational multiple of Fsi, i.e., Fso=Fsi·(P/Q), wherein P and Q are integers. In these embodiments, $\lambda$=P/Q is a rational number, and P and Q are coprime integers, i.e., the only positive integer that divides both P and Q is 1. In other embodiments, $\lambda$ is an irrational number. In performing rate up-sampling, Fso is selected higher than Fsi, i.e., $\lambda$>1.

Consider, for example, multiple narrowband signals having a symbol rate of 3 Mbaud (the term "baud" means symbols per second), and the corresponding broadband signal having a sampling rate of 37 MHz. In some applications, symbols at the input of the digital transmitter contain $2^k$ samples per symbol, k being an integer. Equivalently, Fsi is required to be a power of 2 of the symbol rate. Assuming, for example, that Fsi equals $2^2$=4 times the symbol rate, Fsi=3·4=12 MHz, and the integers P and Q can be selected as P=37 and Q=12, so that Fso=Fsi·(37/12). As will be described below, in some efficient transmitter architectures, storage space increases with P, and therefore P should be selected as small as possible.

Efficient Digital Transmitter Architecture

Figure 2:
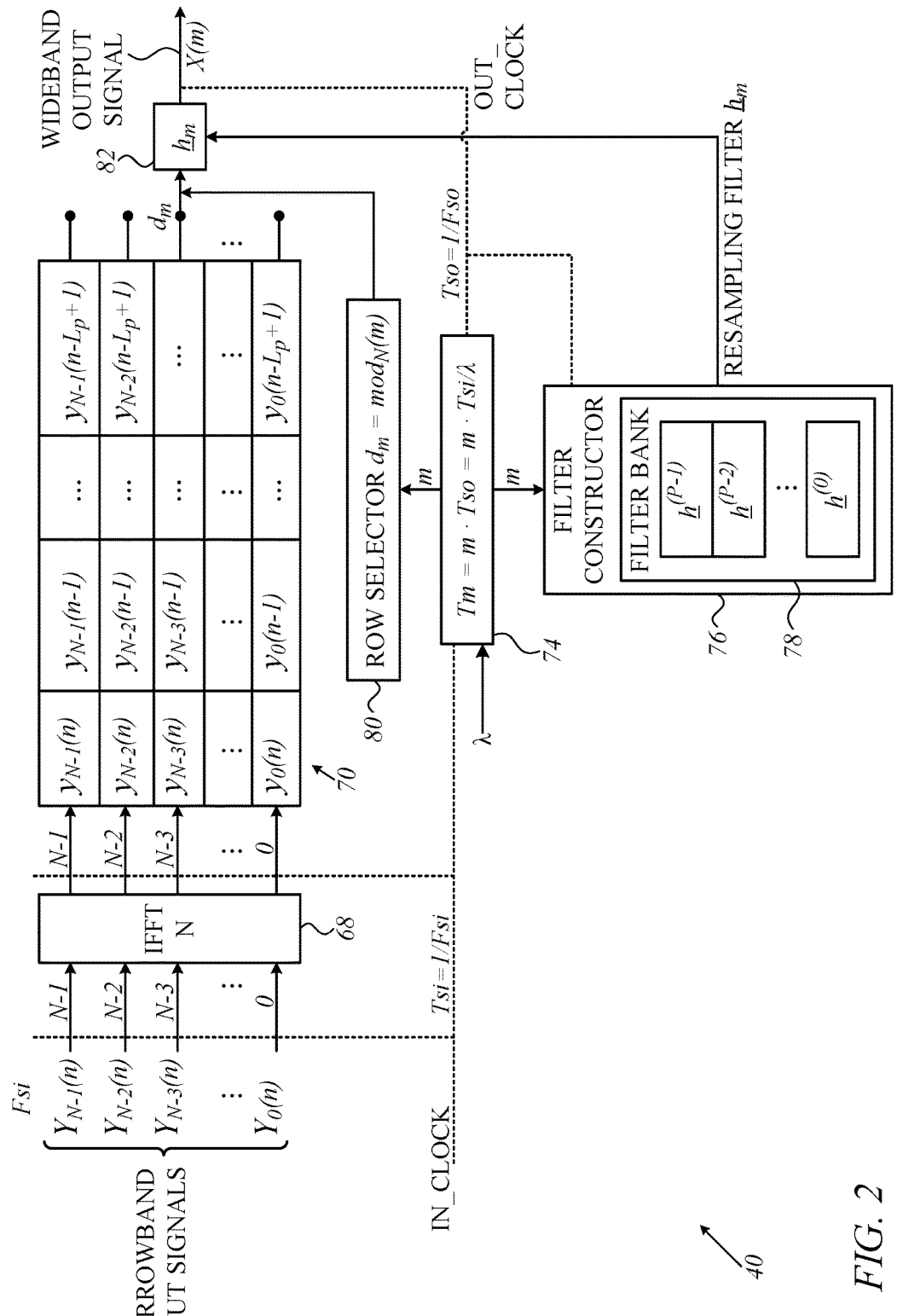
FIG. 2 is a block diagram that schematically illustrates a synthesis channelizer implementing the digital transmitter of FIG. 1 by combining multiple up-converted signals that are up-sampled to an arbitrary sampling rate, in accordance with an embodiment that is described herein.

FIG. 2 is a block diagram that schematically illustrates a synthesis channelizer implementing the digital transmitter of FIG. 1 by combining multiple up-converted signals that are up-sampled to an arbitrary sampling rate, in accordance with an embodiment that is described herein. The channelizer of FIG. 2 can be used in various applications such as, for example, in processing chain 24 of CMTS 20 of FIG. 1.

The channelizer architecture in FIG. 2 can also be used, for example, in implementing frequency-domain equalization as a part of a receiver, or in processing signals unrelated to transmission or reception, such as in processing audio signals.

In the description that follows, the channelizer of FIG. 2 will be described mainly in relation to implementing the digital transmitter of FIG. 1. As such, the terms "channelizer" and "digital transmitter" are used below interchangeably. As noted above, however, the channelizer of FIG. 2 can also be used in various other signal processing, communication and other applications.

As one example, the channelizer of FIG. 2, or digital transmitter 40 can be used for combining N single-carrier signals that have the same bandwidth BW and that are all sampled at a rate Fsi of (2·BW) or higher, by up-sampling each of the single-carrier signals to Fso≥N·BW and up-converting to center frequencies with a frequency spacing of BW. As another example, digital transmitter 40 can be used in an analysis-synthesis system that includes a suitable multi-channel receiver, e.g., such as the receiver described in U.S. patent application Ser. No. 15/613,293 cited above.

Digital transmitter 40 receives N signals denoted $Y_0(n) \ldots Y_{N-1}(n)$ that each having an input sampling rate Fsi, and outputs an output signal X(m) having an output sampling rate Fso. Input signals $Y_0(n) \ldots Y_{N-1}(n)$ can be provided to the digital transmitter, for example, by slice processor 36, or by any other suitable source. The time interval between consecutive samples of $Y_0(n)$, k=0 ... N−1 is denoted Tsi, wherein Tsi=1/FSi. The rate-conversion ratio $\lambda$=Fso/Fsi is a predefined arbitrary positive number that can be an irrational number.

The input signals are baseband narrowband signals that each corresponds to a respective frequency-slice within the wideband signal produced by the digital transmitter. As such, the input signals are also referred to herein as "frequency-slice signals," or simply "frequency-slices," for brevity.

In the present example, in addition to resampling each of the N input signals by the rate-conversion ratio $\lambda$=Fso/Fsi, the digital transmitter shifts the N input signals to N respective center frequencies that are integer multiples of Fso/N.

The number N of input signals and the sampling rates Fsi and Fso are design parameters that are application-dependent. In data over cable applications, in an example embodiment, the number of input signals N can be 32, the output sampling rate can be 100 MHz and the slice bandwidth can be 10 MHz. Other applications, such as, for example, medical or other imaging applications, may require hundreds or even thousands of frequency-slices. In other embodiments, other suitable input sampling rate, output sampling rate and a number of frequency-slices can also be used.

Digital transmitter 40 comprises a transform module 68 that receives N input samples $Y_0(n) \ldots Y_{N-1}(n)$, i.e., a vector comprising a sample from each of the N input signals corresponding to a time instance n·Tsi, and produces N respective transformed samples $y_0(n) \ldots y_{N-1}(n)$. In the present example, transform module 68 comprises a time-frequency transform, i.e., an N-point Inverse Fast Fourier Transform (IFFT) module that implements an Inverse Discrete Fourier Transform (IDFT) efficiently. The IDFT transformed samples are related to the input samples using the expression:

$$y_l(n) = \sum_{l=0}^{N-1} Y_k(n) \cdot \exp\left(j2\pi \cdot \frac{l}{N} \cdot k\right), l = 0 \ldots N-1 \quad \text{Equation 4}$$

In alternative embodiments, transform module 68 can implement other suitable types of transforms. For example, based on known mathematical relationships between the Discrete Fourier Transform (DFT) and the IDFT, transform module 68 can be replaced, mutatis mutandis, with a module that applies DFT, e.g., using a Fast Fourier Transform (FFT) module.

Digital transmitter 40 comprises a memory buffer 70 for storing the transformed samples $y_0(n) \ldots y_{N-1}(n)$. In the example of FIG. 2, memory buffer 70 stores a total number of N·Lp transformed samples, wherein Lp is a filter-length parameter. Memory buffer 70 is organized as a two-dimensional (2D) array of N rows and Lp columns. The concatenation of the columns forms a linear array that stores the transformed samples sequentially. The leftmost column stores the transformed samples $[y_0(n) \ldots y_{N-1}(n)]$, the following column stores the transformed samples $[y_0(n-1) \ldots y_{N-1}(n-1)]$, and so on, up to the rightmost column that stores the transformed samples $[y_0(n-Lp+1) \ldots y_{N-1}(n-Lp+1)]$. Along each row of the memory buffer, the time interval between consecutive transformed samples is Tsi.

The memory buffer operates in a First-In First-Out (FIFO) mode. In the present example, the FIFO fills by pushing inputs to its leftmost column. When the digital transmitter receives N samples of the input signals corresponding to input sampling time n·Tsi, the content of the memory buffer is moved one position (column-wise) so that the N least recent transformed samples stored, i.e., corresponding to input sampling time (n−Lp)·Tsi, are discarded, and the N transformed samples corresponding to input sampling time n·Tsi are stored in the leftmost column of the memory buffer. In some embodiments, memory buffer 70 comprises a Random Access Memory (RAM), and managing the memory buffer as a 2D array FIFO is implemented using pointers to relevant memory addresses. For example, the pointers may hold starting addresses of the rows, columns or both.

Digital transmitter 40 comprises a sampler 74 that receives an input clock signal denoted IN_CLOCK having a clock period Tsi, and outputs an output clock signal denoted OUT_CLOCK, having a period Tso=1/Fso. Sampler 74 determines a sampling time denoted Tm for generating an output sample for the output signal X(m), as given by:

$$Tm = m \cdot Tso = m \cdot \frac{Tsi}{\lambda} \quad \text{Equation 5}$$

In some embodiments, sampler 74 is preconfigured with the desired rate-conversion ratio λ, and generates the output clock signal from the input clock signal using Phase Locked Loop (PLL) techniques. In alternative embodiments, both clock signals at the Fsi and Fso rates are derived from a common high-resolution master clock, using respective dedicated PLLs.

Digital transmitter 40 further comprises a filter constructor 76 that generates a resampling filter 82, denoted $\underline{h}_m$. In the present example, the filter constructor comprises a filter bank 78 comprising P sub-filters denoted $\underline{h}^{(0)} \ldots \underline{h}^{(P-1)}$. The sub-filters are associated with respective P sub-intervals of the input sampling interval. In some embodiments, the input sampling interval is divided into P sub-intervals but the number of sub-filters is larger than P, as will be described below. Filter constructor 76 further comprises computational means (e.g., a suitable processor or hardware logic) for selecting one or more sub-filters based on the output sampling time and for calculating the coefficients of the resampling filter from respective coefficients of multiple sub-filters.

Let Hprototype denote a Low-Pass Filter (LPF) having a suitable normalized stopband frequency (e.g., Fsi/(2·Fso)) wherein Hprototype comprises a total number L of coefficients. Although not mandatory, in the present example the number of coefficients of the prototype filter is L=Lp·P. The sub-filters indexed p=0 . . . P−1 in the filter bank are each derived from the prototype filter by taking coefficients of Hprototype at intervals P starting at filter index p as given by:

$\underline{h}^{(p)}=$Hprototype$[p, p+P, \ldots, p+(Lp-1) \cdot P], p=0 \ldots$
$\quad P-1 \quad$ Equation 6:

In the present example, each of the sub-filters has Lp coefficients. The sub-filters derived in the described manner are also referred to as "Polyphase filters."

The prototype LPF can be modelled as having a low-attenuation passband and a high-attenuation stopband. The frequency-range of the passband is zero to a predefined passband frequency and the frequency-range of the stopband is above a predefined stopband frequency that is larger than or equal to the passband frequency. The frequency-range between the passband and stopband frequencies is also referred to as a transition band. The passband and stopband frequencies, as well as the maximal attenuation over the passband range and the minimal attenuation over the stopband range are application-dependent design parameters.

For each output sampling instance Tm determined by sampler 74 as given in Equation 5 above, the filter constructor generates resampling filter 82 having Lp coefficients, based on one or more of the P sub-filters. In some embodiments, the resampling filter equals one of the sub-filters, in which case the filter constructor selects the relevant sub-filter from the filter bank, and no extra storage is required for storing the coefficients of the resampling filter. In other embodiments, the filter constructor calculates the coefficients of the resampling filter by interpolating respective coefficients of two or more sub-filters, as will be described in detail below.

The digital transmitter comprises a row selector 80 that selects a row of transformed samples from the memory buffer whose row index $d_m$ is given by:

$$d_m = \text{mod}_N(m) = \text{mod}_N(d_{m-1}+1) \quad \text{Equation 7:}$$

Note that the row selector can alternatively calculate $d_m$ by applying the modulo N operation to m+c, wherein c is a predefined integer, which causes a respective phase shift to the up-converted signals.

The digital transmitter filters the samples of the selected row $[y_{d_m}(n_m) \ldots y_{d_m}(n_m-Lp+1)]$ to produce an output sample X(m) using resampling filter 82, by calculating the convolution:

$$X(m) = \sum_{i=0}^{Lp-1} h_m(i) \cdot y_{d_m}(n_m - i) \quad \text{Equation 8}$$

In Equation 8, $n_m$ represents the time index of the transformed samples in the most recently updated column of the memory buffer (the leftmost column in the figure) at the time instance Tm, as given by:

$$n_m = \text{Floor}\left(\frac{m}{\lambda}\right) \quad \text{Equation 9}$$

Consider first an embodiment in which λ is an integer i.e., equals the number of sub-filters P. For each N buffered samples corresponding to input time instance $n_m \cdot \text{Tsi}$, the transmitter produces P output samples $X(n_m \cdot P+p)$, p=0 . . . P−1, by filtering the rows indexed by modulo$_N$([m, . . . , m+P−1]) using the respective sub-filters [$\underline{h}^{(0)}$ . . . $\underline{h}^{(P-1)}$]. In this embodiment, for successive output samples, the transmitter selects successive rows in the memory buffer and successive sub-filters in the filter bank.

Consider now embodiments in which the rational rate-conversion ratio has the form λ=P/Q, wherein P and Q are integers and P>Q. In this case the rate-conversion ratio represents up-sampling by an integer factor P and down-sampling by an integer factor Q. To produce the wideband output signal, the transmitter processes the samples in memory buffer 70 in accordance with the output sampling rate, i.e., at time instances given by:

$$Tm = m \cdot Tso = m \cdot Tsi \cdot \frac{Q}{P}, m = 0, 1, 2, \ldots \quad \text{Equation 10}$$

To process the buffered samples, row selector 80 selects a row of transformed samples in the memory buffer having a row index $d_m$ as given in Equation 7, and further selects a sub-filter out of the P sub-filters in the filter bank whose filter index $p_m$ depends on the output sampling instance as given by:

$$p_m = \text{mod}_P(m \cdot Q) = \text{mod}_P(p_{m-1}+Q) \quad \text{Equation 11:}$$

The row index $d_m$ gets values in the range 0 . . . N−1, whereas the filter index $p_m$ gets values in the range 0 . . . P−1. Between consecutive values of the output time index m, the row index $d_m$ advances by a unity modulo N, whereas the sub-filter index $p_m$ advances by Q modulo P. Advancing by Q allows efficient implementation by skipping the calculation of (Q−1) output samples that are omitted because of the down-sampling by the integer factor Q.

The transmitter calculates an output sample X(m) from the samples in the memory buffer by filtering the Lp samples of the selected row $d_m$ using the selected sub-filter $\underline{h}^{(p_m)}$.

A transmitter configuration with an arbitrary rate-conversion ratio requires filter constructor 76 to calculate the coefficients of resampling filter 82 from two or more sub-filters, as will be described below. Alternatively, in an embodiment, the filter constructor selects the sub-filter corresponding (or aligned) to the closest sub-interval edge to approximate the output sample value.

The storage area required for storing the P sub-filters in filter bank 78 increases linearly with P. As a result, a digital transmitter design that requires a rational rate-conversion ratio P/Q with large integers P and Q, requires large memory area accordingly.

In some embodiments, to reduce the storage area required for the sub-filters of the filter bank, the desired rate-conversion ratio λ=P1/Q1 (P1 and Q1 are large coprime integers) is approximated by a ratio P/Q for which P and Q are relatively small. For example, if the actual rate-conversion ratio is λ=31/20 (P1=31, Q1=20), λ can be approximated by the ratio 3/2 (P=3, Q=2). Since P1=10·P, the storage area for the filter bank in this case is reduced by 90%. A similar approach can be adopted for a rate-conversion ratio λ that is an irrational number. For example, for λ=√2≈71/50, an approximate ratio can be selected as λ≈7/5, i.e., P=7, Q=5. In this example, the exact rate-conversion ratio can be expressed as λ=(5·√2/7)·(7/5) with P=7. The resampling filter is approximated by interpolating between two or more of the P sub-filters, as will be described below. Embodiments in which λ is an irrational number, or a rational number P1/Q1 approximated by another rational number P/Q so that P<P1 will be described in detail below.

Note that generally λ is not necessarily restricted to be equal to or be approximated by a rational number, as will be described in detail below.

In some embodiments, the digital transmitter creates a null frequency-slice in the output signal, by receiving or generating a zero input signal, e.g., an input signal that comprises all zero samples, and up-converting the zero input signal to a respective center frequency of the frequency-slice. This method can be used, for example for padding empty channels, e.g., at the lower and/or higher edges of the output signal bandwidth, or for creating one or more null frequency-slices within the bandwidth of the output signal. For example, given 10 channels to be combined, the total number of inputs to the digital transmitter can be selected to be N=14, and a zero signal, comprising all zero samples, is provided to four inputs $Y_0(n)$, $Y_1(n)$, $Y_{12}(n)$ and $Y_{13}(n)$. Note that instead of receiving a zero input signal from an external source such as the slice processor, the digital transmitter may generate the zero input signal internally.

The configurations of CMTS 20 and synthesis channelizer implementing digital transmitter 40 shown in FIGS. 1 and 2 are example configurations, which are chosen purely for the sake of conceptual clarity. In alternative embodiments, any other suitable CMTS and channelizer configurations can be used.

The division of functions among CATV interface 32, digital transmitter 40 and slice processor 36 may differ from the division shown in FIG. 1. The CATV interface, digital transmitter and slice processor may be integrated in a single device (e.g., on a single silicon die) or implemented in separate devices (e.g., separate silicon dies). Further alternatively, processing chains 24 can be implemented in separate devices or integrated into one or more devices.

The different elements of digital transmitter 40 may be implemented using suitable hardware, such as in one or more Application-Specific Integrated Circuits (ASICs) or Field-Programmable Gate Arrays (FPGAs). Memory buffer 70 may be implemented using any suitable type of memory, e.g., a Random Access Memory (RAM).

In some embodiments, some elements of digital transmitter 40, e.g., filter constructor 76 and/or transform module 68, can be implemented using software, or using a combination of hardware and software elements. Elements of digital transmitter 40 that are not mandatory for understanding of the disclosed techniques have been omitted from the figure for the sake of clarity.

In some embodiments, some of the functions of digital transmitter 40 may be implemented in a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In the context of the present patent application and in the claims, the elements of digital transmitter 40 excluding memory buffer 70 are referred to collectively as "circuitry." In the example of FIG. 2, the circuitry comprises sampler 74, row selector 80, transform module 68, filter constructor 76 with filter bank 78 and resampling filter 82.

Resampling Using an Irrational Rate-Conversion Ratio

Figure 3:
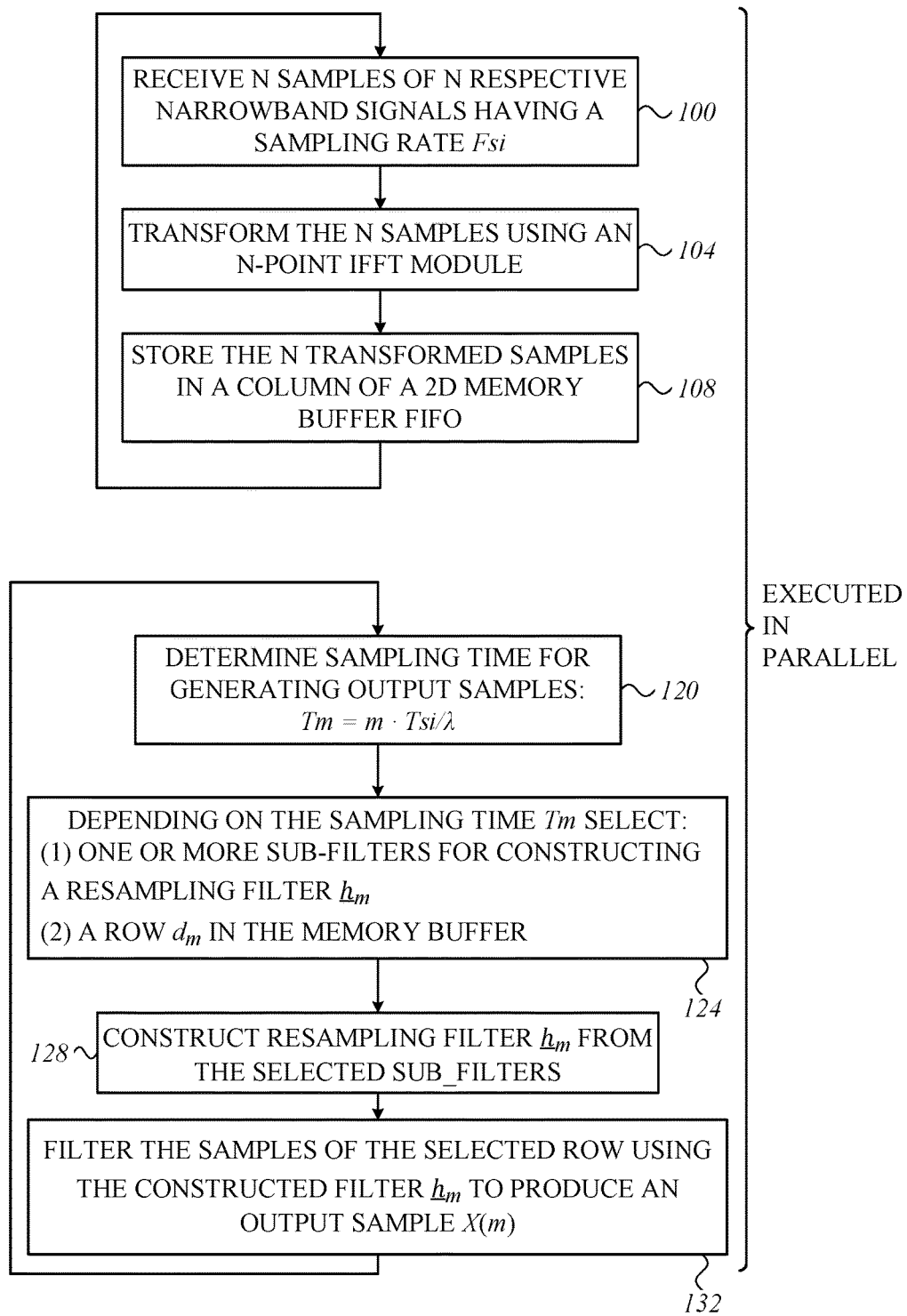
FIG. 3 is a flow chart that schematically illustrates a method for channelizing multiple narrowband signals into a broadband signal, including resampling with an arbitrary rate-conversion ratio, in accordance with an embodiment that is described herein.

FIG. 3 is a flow chart that schematically illustrates a method for channelizing multiple narrowband signals into a broadband signal, including resampling with an arbitrary rate-conversion ratio, in accordance with an embodiment that is described herein.

The method is described as being executed by digital transmitter 40 of FIG. 2. In describing the method we make the following assumptions:

The input sampling rate Fsi, the desired output sampling rate Fso, the number N of frequency-slices and the number P of Polyphase sub-filters are predetermined design parameters.

The desired rate-conversion ratio $\lambda$=Fso/Fsi is an irrational number, or a rational number P1/Q1 wherein P1 is different from the number of sub-filters P. Using a number of sub-filters P that is smaller than P1 reduces the required storage area and computational load.

The rate-conversion ratio can be represented as $\lambda$=P/q, wherein P is the number of sub-filters and q is a positive real number.

A prototype LPF—Hprototype has been designed with a suitable normalized stopband frequency, given by $1/(2\cdot\lambda)$=q/(2·P), using any suitable filter design method. The normalized stopband frequency $1/(2\cdot\lambda)$ is given by way of example and is not mandatory. Alternatively, any other suitable normalized stopband frequency can also be used. In the present example, the number of coefficients in Hprototype is Lp·P, wherein Lp is selected to meet certain design constrains such as ripple and/or attenuation in the passband and stopband of the filter. In some embodiments, e.g., when the narrowband signal occupies less than half the slice bandwidth, Hprototype is designed with a normalized stopband frequency that is larger than $1/(2\cdot\lambda)$. Further alternatively, a normalized stopband frequency smaller than $1/(2\cdot\lambda)$ can also be used. In this case filtering operations that are typically carried out in slice processor 36 may be incorporated, instead, in the prototype LPF of the digital transmitter. For example, the prototype LPF can be designed as a shaping filter that is typically implemented, per channel, as part of the slice processor functionality, e.g., a Square-Root-Raised-Cosine (SRRC) or any other suitable shaping filter. In such embodiments, input signals (slice-signals) containing symbols mapped in a predefined modulation constellation can be provided directly to the digital transmitter so that some or all of the required rate-conversion processing is carried out efficiently by the digital transmitter.

P sub-filters have been derived from the prototype filter, as described above, and the coefficients of these sub-filters where stored in filter bank 78. The P sub-filters are associated with P respective sub-intervals dividing the input sampling interval. In some embodiments, the number of sub-filters is larger than the number of sub-intervals dividing the input sampling interval, as will be described below.

Note that designing Hprototype with Lp·P coefficients is given by way of example. In alternative embodiments, the length of Hprototype is not necessarily a multiple of P. For example, different sub-filters may have different respective lengths Lp(p), and the convolution calculation in Equation 8 above changes accordingly. As another example, in embodiments in which the number of sub-filters is larger than the number of sub-intervals dividing the input sampling interval, the length of the prototype filter is given, for example, by Lp·(P+P') for deriving P'≥1 additional sub-filters from the prototype filter, wherein the P sub-filters correspond to a common input sampling interval, and at least one additional filter corresponds to a subsequent input sampling interval.

The method of FIG. 3 includes two parts, which the digital transmitter executes in parallel. The upper part method in FIG. 3 handles the filling of memory buffer 70 at the input sampling rate Fsi. The lower part in FIG. 3 handles producing output samples of the broadband signal X(m) at the output sampling rate Fso based on the memory buffer content.

The upper part of the method begins with the digital transmitter receiving N samples of N respective input signals at time instances that are multiples of Tsi=1/Fsi, at a reception step 100. At a transformation step 104, the digital transmitter applies to the N recently received samples an N-point Inverse Discrete Fourier Transform (IDFT) using IFFT for implementing transform module 68, which produces N transformed samples. At a buffering step 108, the digital transmitter pushes the columns of the memory buffer one position and stores the recently transformed samples in the leftmost column of the memory buffer. Following step 108 the method loops back to step 100 to receive a subsequent vector N samples of the input signals.

The lower part of the method of FIG. 3 begins with sampler 74 of the digital transmitter determining a sampling time Tm for producing output samples, at an output timing determination step 120. In an embodiment, Tm is a multiple of (Tsi/$\lambda$) as given in Equation 5 above.

At a selection step 124, the digital transmitter (i) selects one or more sub-filters of the filter bank to be used for constructing resampling filter 82 and (ii) selects, using the row selector, a row $d_m$ of the memory buffer as given in Equation 7 above.

At a resampling filter construction step 128, filter constructor 76 calculates the coefficients of the resampling filter $\underline{h}_m$ that is suitable for producing an output sample X(m) at time Tm, from the coefficients of the sub-filters that were selected at step 100. At an output step 132, the digital transmitter filters the Lp samples stored in the selected row $d_m$ of the memory buffer, using the resampling filter $\underline{h}_m$. Following step 132 the method loops back to step 120 to determine a subsequent output sampling time.

Now we describe in detail methods for constructing the resampling filter, and for performing the filtering operation. In the present example, the filter constructor calculates the coefficients of the resampling filter by applying a linear interpolation operation among the respective coefficients of two sub-filters. Alternatively, other suitable interpolation methods using more than two sub-filters can also be used.

Assume that the desired output time sample falls between two consecutive instances of the input sampling times. Given the output sampling index m, the interval between $Tsi \cdot n_m^-$ and $Tsi \cdot (n_m^- + 1)$ can be virtually divided into P sub-intervals of equal duration Tsi/P, wherein $n_m^-$ is given by:

$$n_m^- = \text{Floor}\left(\frac{m}{\lambda}\right) = \text{Floor}\left(\frac{m \cdot q}{P}\right) \quad \text{Equation 12}$$

Note that output samples that are aligned to the edges of the sub-intervals can be produced by filtering a relevant row of samples in the memory buffer using a respective sub-filter selected from the filter bank. An output sample that falls inside a sub-interval (i.e., is not aligned to any of the sub-intervals) can be approximated, in an embodiment, by selecting a sub-filter aligned to the edge of a sub-interval that is closest to the desired sampling time. In this embodiment, the output sample value is approximated by selecting a single filter serving as the resampling filter. In other embodiments, a resampling filter is calculated by interpolating between the sub-filters whose indices $p_m^-$ and $p_m^+$ in the filter bank are given by:

$$p_m^- = \text{Floor}\left[\left(\frac{m}{\lambda} - N_m^-\right) \cdot P\right] \quad \text{Equation 13}$$
$$= \text{modulo}_P[\text{Floor}(m \cdot q)]$$
$$p_m^+ = \text{modulo}_P(p_m^- + 1)$$

In the present example, the impulse response of the resampling filter is calculated as a linear interpolation between the sub-filters $h^{(p_m^-)}$ and $h^{(p_m^+)}$:

$$\underline{h}_m = (1 - \alpha_m) \cdot h^{(p_m^-)} + \alpha_m \cdot h^{(p_m^+)} \quad \text{Equation 14:}$$

wherein $\alpha_m$ is an interpolation weight given by:

$$\alpha_m = \left[\frac{m}{\lambda} - \left(n_m^- + \frac{p_m^-}{P}\right)\right] = \text{modulo}_1(m \cdot q) \quad \text{Equation 15}$$

Note that in an embodiment, when $p_m^-$ in Equation 13 corresponds to the sub-filter $p_m^- = (P-1)$, the filter index $p_m^+$ folds to 0, i.e., should be used for filtering after storing in the memory buffer the transformed sample corresponding to input time index $n_m^- + 1$. In such an embodiment, instead of interpolating between the coefficients of $h^{(P-1)}$ and $h^{(0)}$, the filter constructor interpolates $h^{(P-1)}$ with a shifted version of $\underline{h}^{(0)}$ that is shifted one tap. For example, the filter constructor shifts $h^{(0)}$ one tap to the right to remove the rightmost coefficient and adds a zero coefficient to the left of the shifted sub-filter. In an alternative embodiment, the sub-filter $h^{(0)}$ comprises Lp+1 coefficients 0 . . . Lp. In this embodiment, the un-shifted version of $\underline{h}^{(0)}$ corresponds to the coefficients 0 . . . Lp-1, whereas the respective shifted version of $\underline{h}^{(0)}$ corresponds to the coefficients 1 . . . Lp.

In some embodiments, to handle the $p_m^- = (P-1)$ case, the digital transmitter stores in the filter bank one or more additional sub-filters, which are derived from the same prototype filter as the P sub-filters assigned respectively to the P sub-intervals of the input sampling interval. For example, to derive one additional sub-filter, the prototype filter should have at least $Lp \cdot (P+1)$ coefficients. For example, the sub-filter $h^{(P)}$ (corresponding to the subsequent input sampling interval) is derived by sampling the coefficients of the prototype filter at P intervals starting at the coefficient index P, and stored in the filter bank. In this example, the filter constructor interpolates between the coefficients of $h^{(P-1)}$ and $h^{(P)}$. Moreover, the calculation in Equation 13 is replaced with $$p_m^+ = (p_m^- + 1).$$

In the method of FIG. 3, the filter constructor produces the resampling filter by interpolating between two (or more) of the sub-filters, and then uses the interpolated resampling filter to filter transformed samples in a relevant row of the memory buffer. In alternative embodiments, filtering is performed prior to interpolation, i.e., the digital transmitter first produces two filtered samples using sub-filters $h^{(p_m^-)}$ and $h^{(p_m^+)}$, and then interpolate between the two filtered samples to produce X(m), e.g., using linear interpolation.

Specifically, when $p_m^- < P-1$, the digital transmitter filters the samples of row $d_m$ selected in accordance with Equation 7 using each of the sub-filters $h^{(p_m^-)}$ and $h^{(p_m^+)}$ to produce two filtered samples that are aligned to the respective time instances $(n_m^- + p_m^-/P) \cdot Tsi$ and $(n_m^- + p_m^+/P) \cdot Tsi$. The digital transmitter calculates the interpolated sample X(m) by calculating a weighted sum of the two filtered samples using the interpolation weight $\alpha_m$ of Equation 15. In case $p_m^- = P-1$, we have $\overline{h}^{(p_m^+)} = \underline{h}^{(0)}$, and the digital transmitter calculates the respective filtered sample using a shifted version of the sub-filter $\underline{h}^{(0)}$, as described above. In an alternative embodiment, when $p_m^- = P-1$, for times $(n_m^- + p_m^-/P) \cdot Tsi$ and $(n_m^- + 1) \cdot Tsi$, the digital transmitter selects for filtering the same row $d_m$ using the respective sub-filters $\overline{h}^{(P-1)}$ and $\overline{h}^{(0)}$ (with no shifting). This means that before filtering the samples of the selected row using) $\overline{h}^{(0)}$, the digital transmitter waits for a subsequent sample to be pushed into the memory buffer, and the time shift operation in this case applies to the buffered samples instead of shifting a sub-filter as described above.

The embodiments described above are given by way of example, and other suitable embodiments can also be used. For example, although in the method of FIG. 3 an output sample is approximated using linear interpolation between two sub-filters (or between two filtered samples) the method can similarly apply any suitable interpolation method using more than two sub-filters.

Although the embodiments described herein mainly address a synthesis channelizer operating in a CATV system, the methods and systems described herein can also be used in other applications, such as in digital broadcasting over satellite, cables or radio, for hubs communicating with multiple devices, for communication with frequency hopping and the like. The disclosed channelizer architecture can be used, for example, in analysis and synthesis of signals, for frequency domain equalization of broadband signals and in audio signal processing, to name a few.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A digital synthesis channelizer, comprising:
a memory buffer, configured to store samples of N input signals having a sampling rate Fsi, the N input signals are processed, prior to storing in the memory buffer, by an N-point time-frequency transform module; and
circuitry, comprising at least P filters derived from a prototype Low-Pass Filter (LPF) whose stopband frequency depends on Fsi, wherein the circuitry is configured to:
set a sampling time according to a predefined output sampling rate Fso=$\lambda$·Fsi, wherein $\lambda$ being a predefined rate-conversion ratio;
based on the sampling time, select one or more filters out of the at least P filters; and
using the selected one or more filters generate, from at least some of the samples in the memory buffer, a filtered and interpolated output sample of an output signal, wherein the output signal sums N digitally resampled by $\lambda$ and frequency-shifted versions of the respective N input signals.

2. The digital synthesis channelizer according to claim 1, wherein the circuitry is configured to compute the filtered and interpolated output sample (i) after setting the sampling time and (ii) as a function of the sampling time.

3. The digital synthesis channelizer according to claim 1, wherein $\lambda$ is an irrational number.

4. The digital synthesis channelizer according to claim 1, wherein $\lambda$ equals a rational number P1/Q1, P1 and Q1 being integer numbers, and P1 is different from P.

5. The digital synthesis channelizer according to claim 1, wherein the circuitry is configured to generate the output signal with the input signals frequency-shifted to respective center frequencies that are multiples of Fso/N.

6. The digital synthesis channelizer according to claim 1, wherein the circuitry is configured to calculate the filtered and interpolated output sample by selecting multiple filters, out of which first and second filters correspond respectively to a first sampling time that occurs before or at the sampling time, and to a second sampling time that occurs after the sampling time, and calculating a resampling filter by interpolating among respective coefficients of the multiple filters, depending on an offset of the sampling time from the first sampling time.

7. The digital synthesis channelizer according to claim 6, wherein the circuitry is configured to calculate the resampling filter by interpolating among the multiple filters using a shifted version of at least one of the multiple filters.

8. The digital synthesis channelizer according to claim 1, wherein the circuitry is configured to calculate the filtered and interpolated output sample by selecting multiple filters, out of which first and second filters are aligned respectively to a first sampling time that occurs before or at the sampling time, and to a second sampling time that occurs after the sampling time, filtering the at least some of the samples in the memory buffer using each of the multiple filters to produce multiple respective filtered outputs, and interpolating among the filtered outputs depending on an offset of the sampling time from the first sampling time.

9. The digital synthesis channelizer according to claim 8, wherein the circuitry is configured to wait until storing subsequent N samples in the memory buffer, prior to producing at least one of the filtered outputs using a respective filter.

10. The digital synthesis channelizer according to claim 1, wherein the circuitry is configured to select a first filter that corresponds to an input sampling interval, and a second filter that corresponds to a subsequent input sampling interval, and to calculate a resampling filter by interpolating between coefficients of the first and second filters.

11. The digital synthesis channelizer according to claim 1, wherein the sampling time falls within a given sub-interval of an input sampling interval, wherein the circuitry is configured to select first and second filters that are aligned to respective first and second edges of the sub-interval, and to approximate a value of the filtered and interpolated output sample, by selecting one of the first and second filters.

12. The digital synthesis channelizer according to claim 1, wherein the circuitry is configured to create a null frequency-slice in the output signal, by receiving or generating a zero input signal comprising all zero samples, and up-converting the zero input signal to a respective center frequency of the frequency-slice.

13. A method, comprising:
in a digital synthesis channelizer, storing samples of N input signals having a sampling rate Fsi in a memory buffer of the digital synthesis channelizer, the N input signals are processed, prior to storing in the memory buffer, by an N-point time-frequency transform module, wherein the digital synthesis channelizer comprising at least P filters derived from a prototype Low-Pass Filter (LPF) whose stopband frequency depends on Fsi;
setting a sampling time according to a predefined output sampling rate Fso=$\lambda$·Fsi, wherein $\lambda$ being a predefined rate-conversion ratio;
based on the sampling time, selecting one or more filters out of the at least P filters; and
using the selected one or more filters, generating from at least some of the samples in the memory buffer, a filtered and interpolated output sample of an output signal, wherein the output signal sums N digitally resampled by $\lambda$ and frequency-shifted versions of the respective N input signals.

14. The method according to claim 13, wherein generating the filtered and interpolated output sample comprises computing the filtered and interpolated output sample (i) after setting the sampling time and (ii) as a function of the sampling time.

15. The method according to claim 13, wherein $\lambda$ is an irrational number.

16. The method according to claim 13, wherein $\lambda$ equals a rational number P1/Q1, P1 and Q1 being integer numbers, and P1 is different from P.

17. The method according to claim 13, and comprising generating the output signal with the input signals frequency-shifted to respective center frequencies that are multiples of Fso/N.

18. The method according to claim 13, wherein generating the filtered and interpolated output sample comprises calculating the filtered and interpolated output sample by selecting multiple filters, out of which first and second filters correspond respectively to a first sampling time that occurs before or at the sampling time, and to a second sampling time that occurs after the sampling time, and calculating a resampling filter by interpolating among respective coefficients of the multiple filters, depending on an offset of the sampling time from the first sampling time.

19. The method according to claim 18, wherein calculating the resampling filter comprises interpolating among the multiple filters using a shifted version of at least one of the multiple filters.

20. The method according to claim 13, wherein generating the filtered and interpolated output sample comprises calculating the filtered and interpolated output sample by selecting multiple filters, out of which first and second filters are aligned respectively to a first sampling time that occurs before or at the sampling time, and to a second sampling time that occurs after the sampling time, filtering the at least some of the samples in the memory buffer using each of the multiple filters to produce multiple respective filtered outputs, and interpolating among the filtered outputs depending on an offset of the sampling time from the first sampling time.

21. The method according to claim 20, and comprising waiting until storing subsequent N samples in the memory buffer, prior to producing at least one of the filtered outputs using a respective filter.

22. The method according to claim 13, wherein selecting the one or more filters comprises selecting a first filter that corresponds to an input sampling interval, and a second filter that corresponds to a subsequent input sampling interval, and comprising calculating a resampling filter by interpolating between coefficients of the first and second filters.

23. The method according to claim 13, wherein the sampling time falls within a given sub-interval of an input sampling interval, wherein selecting the one or more filters comprises selecting first and second filters that are aligned to respective first and second edges of the sub-interval, and wherein generating the filtered and interpolated output sample comprises approximating a value of the filtered and interpolated output sample, by selecting one of the first and second filters.

24. The method according to claim 13, and comprising creating a null frequency-slice in the output signal, by receiving or generating a zero input signal comprising all zero samples, and up-converting the zero input signal to a respective center frequency of the frequency-slice.

* * * * *